United States Patent [19]

Divan

[11] Patent Number: 5,099,410
[45] Date of Patent: Mar. 24, 1992

[54] SINGLE PHASE AC POWER CONVERSION APPARATUS

[75] Inventor: Deepakraj M. Divan, Madison, Wis.

[73] Assignee: Wisconsin Alumni Research Foundation, Madison, Wis.

[21] Appl. No.: 611,961

[22] Filed: Nov. 13, 1990

[51] Int. Cl.[5] .............................................. H02M 5/458
[52] U.S. Cl. ..................................... 363/98; 363/132; 318/811
[58] Field of Search ..................... 363/40, 41, 56, 58, 363/59, 60, 89, 97, 98, 131, 132; 323/299; 361/18, 90, 91, 111; 307/64–66; 318/801, 811

[56] References Cited

U.S. PATENT DOCUMENTS

| | | | |
|---|---|---|---|
| 4,651,079 | 3/1987 | Wills | 318/811 |
| 4,656,571 | 4/1987 | Umezu | |
| 4,706,180 | 11/1987 | Wills | 363/132 |
| 4,935,861 | 6/1990 | Johnson, Jr. et al. | 363/132 |
| 4,980,812 | 12/1990 | Johnson, Jr. et al. | 363/89 X |
| 5,017,800 | 5/1991 | Divan | 363/37 X |

FOREIGN PATENT DOCUMENTS

| | | |
|---|---|---|
| 0358191 | 3/1990 | European Pat. Off. |
| 62-233069(A) | 10/1987 | Japan |
| 2111326A | 6/1983 | United Kingdom |

OTHER PUBLICATIONS

D. M. Divan, "A New Topology for Single-Phase Uninterruptible Power Supplies," IEEE-Industry Applications Society Conference Record, 1989, pp. 931–936.

D. M. Divan, "A New Topology For Single Phase UPS Systems," No Date.

D. M. Divan, T. A. Lipo, T. G. Habetler, "PWM Techniques For Voltage Source Inverters," Tutorial Notes, Power Electronics Specialists Conference '90, San Antonio, Texas, Jun. 1990.

*Primary Examiner*—R. Skudy
*Assistant Examiner*—Emanuel Todd Voeltz
*Attorney, Agent, or Firm*—Foley & Lardner

[57] ABSTRACT

A power conversion apparatus (20) circuit includes pairs of rectifying devices (48,49) connected together at a first node, a pair of capacitors (50, 51) connected together at a second node, and pairs of controllable switching devices (53,54) connected together at a third node, each of the pairs being connected in parallel by DC bus lines (58,59). The AC power source (21) is connected between the first and second nodes and the output voltage to a load (22) is provided between the first and third nodes. The switching devices (53,54) are controlled to switch on and off at proper times to provide a controllable output voltage to the load (22) which is at the same frequency as the input voltage and which may be controlled from zero to substantially twice the peak-to-peak input voltage. The output voltage waveform provided to the load can be filtered to provide a substantially sinusoidal waveform to the load. The power conversion apparatus (20) can also function as an uninterruptible power system by connecting an energy storage device, such as a large capacitor (140) or a battery (146) across the DC bus lines (58,59), and by controlling the charging of the energy storage device when power is available for the source and discharging the storage device when the power source fails.

30 Claims, 7 Drawing Sheets

SINGLE PHASE AC POWER CONVERSION APPARATUS

FIELD OF THE INVENTION

This invention pertains generally to the field of electrical power supplies and particularly to power supplies utilizing static power converters.

BACKGROUND OF THE INVENTION

A variety of circuits have been developed for converting electrical power at one voltage or frequency to another voltage or frequency. For example, a common solid state circuit structure for converting alternating current (AC) power to another frequency (AC to AC power conversion) includes a rectifying bridge which converts the input AC voltage to a DC voltage on a DC link and a solid state inverter which inverts the DC voltage to AC power at a desired frequency. A straightforward method for converting the output voltage level to a different level than that of the input voltage is a step up or step down transformer, either on the input or output side. However, transformers are relatively large, heavy and expensive. In particular, if the power supply circuit is intended to allow the output voltage to be maintained at a desired level despite variations in the input voltage (or conversely, to allow the output voltage to be adjusted to a desired level at a constant input voltage), then more complex transformer structures may be required. For example, some power conditioning circuits utilize tap-changing transformers in which the primary includes a number of separate taps which are connected to the input terminals by static switches, with a control circuit monitoring the output voltage and switching the proper static switches on the input side to maintain approximately the desired voltage on the output side. Tap changing arrangements, however, require many switches, such as thyristors, and only permit coarse control of the output voltage. Furthermore, the distortion of the voltage on the load cannot be well controlled.

Another type of line conditioning structure utilizes a ferroresonant transformer in which the transformer itself is connected in a circuit which provides passive compensation for short term changes in the input voltage. Ferroresonant transformers are widely used and give reasonable voltage regulation, typically plus or minus 4% at the output for minus 20% to plus 10% change in the input voltage. However, output distortion can be sensitive to load input harmonics, and the input currents drawn may have undesirable power factors and distortion levels.

Both the tap changing and the ferroresonant transformers are restricted by the presence of the low frequency transformer which must be able to handle full rated power. For example, for a 1 kilo volt ampere (KVA) line conditioner, the transformer by itself can weigh over thirty to forty pounds, and is the major component determining the size of the cabinet containing the power conditioning apparatus.

The Umezu U.S. Pat. No. 4,656,571 uses a voltage doubler to increase the available AC output voltage. However, such circuits typically require that the input AC voltage be fully converted to a DC voltage level on a DC bus and then inverted to AC power utilizing a full bridge, for example, four switching devices to provide a single phase output voltage and six switching devices to provide a three phase output, as shown in the patent to Umezu.

Static power converters are also commonly used in uninterruptible power systems (UPS) in which the converter operates to supply power to a load from the AC source during normal operation, switching to supply power from a storage device (e.g., a battery) connected across the DC bus lines during line power failure. A simple switching converter which provides UPS operation with only two inverter switches is shown in U.K. patent application GB 2,111,326A to Berman.

SUMMARY OF THE INVENTION

A power conversion apparatus in accordance with the present invention allows an AC source voltage at one voltage level to be converted to an output AC voltage at a different voltage level without a transformer and with a minimum of solid state switching devices. AC input power is converted to AC output power at the same frequency and without a full bridge conversion of the input AC to an intermediate DC voltage level. The apparatus can be embodied, for example, as a voltage doubler, can provide power conditioning to regulate the output voltage level despite changes in the input voltage level, and can further be configured as an uninterruptible power supply by providing a backup power source, e.g., a battery, from which power can be drawn to drive the output voltage if the input power fails. Furthermore, the apparatus provides a common neutral for the input (power source) and the output (load).

The basic circuit of the present invention comprises a pair of rectifying devices connected together at a first node, a pair of capacitors connected together at a second node, and a pair of controllable switching devices connected together at a third node, with the pairs of rectifying devices, capacitors, and switching devices being connected in parallel by DC bus lines. These three nodes serve as the three terminals of the converter. The first terminal or node is common to both the input power source and the load, with the second node or terminal connected to the source and the third node or terminal connected to the load. With the load connected between the first and third terminals and the source connected between the first and second terminals, the conversion circuit can be controlled to provide a peak-to-peak output voltage to the load which is substantially doubled from the peak-to-peak input voltage or, with a low pass filter connected to filter the output voltage to the load and to provide a substantially sinusoidal waveform, if desired, to control the output voltage applied to the load so that the voltage across the load can vary from substantially zero to substantially twice the peak-to-peak input voltage. To obtain effective voltage doubling, the controller provides turn-on and turn-off signals to the controllable switches alternately and in phase with the input voltage so that the voltage across one of the charged capacitors plus the input voltage is applied to the load during one-half cycle of the input power waveform, and with the voltage across the other charged capacitor and the input voltage of the opposite polarity applied to the load during the second half of the input voltage waveform. To obtain less than complete voltage doubling of the output voltage across the load, the switching devices are switched on for a duty cycle which is less than a full half cycle of the input voltage waveform. For example, pulse width modulation may be utilized in switching the switching devices so that a desired effective AC voltage is provided across the load. Only two switching devices are required to obtain such operation.

The power conversion apparatus of the present invention can be further extended to uninterruptible power supply operation by providing a DC power storage device across the DC bus lines which connect the pairs of switching devices. The storage device may be a large charged capacitor which can be charged up during normal input power conditions by utilizing switchable rectifying devices rather than passive rectifying devices. The use of active rather than passive devices also allows control of input current, attainment of unity power factor, and control of battery charging if a battery is substituted for the capacitor. The capacitor will provide sufficient power to allow voltage across the load to be maintained during momentary input power loss. To allow sustained continuous output power during total input power loss, a long-term storage device such as a storage battery can be connected across the DC bus and charged during periods of normal input power. During a power outage, the nonneutral input line can be disconnected from the conversion apparatus, and continuous power is then provided to the load from the battery.

The conversion apparatus of the present invention provides a particularly simple circuit structure, requiring only two controllable switching devices to provide AC output power to the load and to allow control of the voltage level of that power to regulate the power level or to compensate for changes in the input voltage level utilizing relatively simple control implementations.

Further objects, features and advantages of the invention will be apparent from the following detailed description when taken in conjunction with the accompanying drawings.

DETAILED DESCRIPTION OF THE INVENTION

Figure 1:
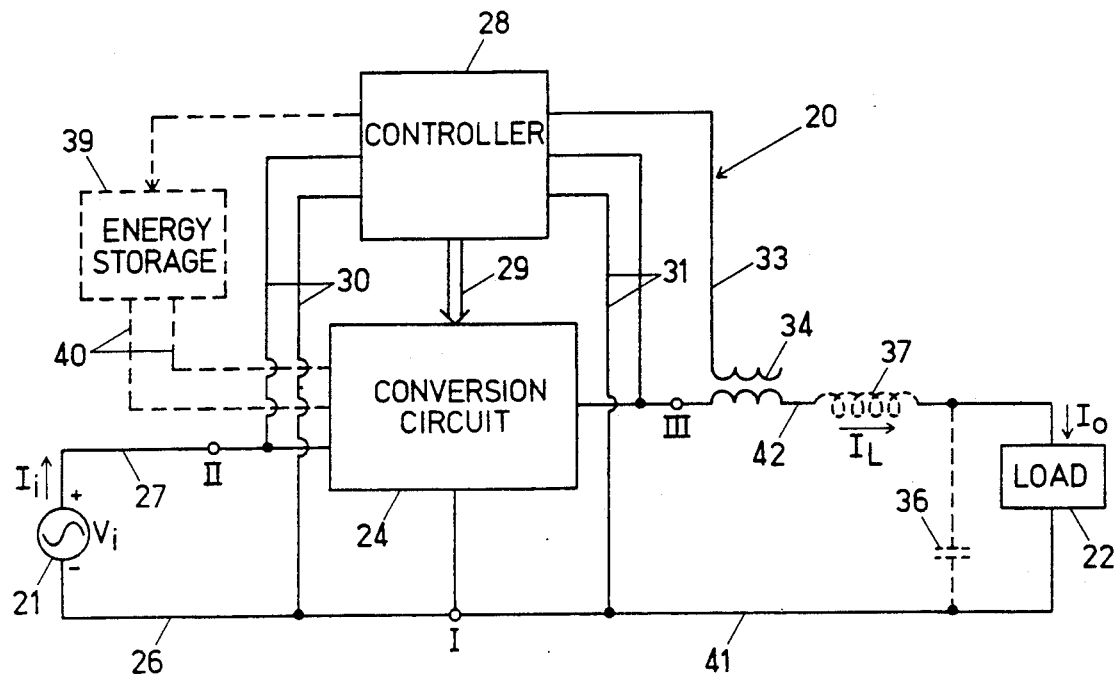
FIG. 1 is a block diagram of the conversion apparatus of the present invention connected in an exemplary configuration to an input power source and to a load.

With reference to the drawings, a generalized block diagram of the power conversion apparatus of the present invention is shown generally at 20 in FIG. 1 connected to receive alternating current (AC) voltage from a source 21 and to deliver AC power to a load 22. The apparatus 20 includes a conversion circuit indicated generally at 24 in FIG. 1 which has three terminals, labeled I, II, and III in FIG. 1. As shown in FIG. 1, the source 21 is connected between the terminals I and II and the load is connected between the terminals I and III. A neutral line 26 connects the terminal I to the source 21 and a neutral line 41 connects the terminal I to the load 22. The conversion circuit 24 is adapted to receive the AC input voltage between the terminals I and II and deliver an AC output voltage of essentially the same frequency between the terminals I and III but at a voltage level which may differ from the voltage provided by the source. The operation of the conversion circuit 24 is controlled by a controller 28 which provides control signals on lines 29 to the conversion circuit 24. For purposes of illustration, the controller 28 is shown as having lines 30 connected across the terminals I and II to sense the input voltage to the conversion circuit, lines 31 connected across the output terminals I and III to sense the output voltage, and a line 33 connected to a current transformer 34 which may be used to sense the current $I_L$ flowing to the load 22.

In the present invention, the conversion circuit 24 can be controlled by the controller 28 to deliver an output voltage to the load 22 which is either twice the peak-to-peak source voltage $V_s$ or some lesser voltage which can be selected to a desired level and which can be regulated to maintain that level despite changes in the value of the source voltage or load current. To obtain adjustable voltage operation to the load, a low pass filter circuit is preferably provided which is composed of a capacitor 36 connected across the terminals I and III and an inductor 37 connected in series with the load between the terminals I and III, with both the capacitor 36 and inductor 37 shown in dashed lines in FIG. 1. This LC filter serves to filter the modulated voltage provided from the conversion circuit 24. Additionally, an optional energy storage device 39, connected to the conversion circuit 24 by lines 40, can provide temporary power to the conversion circuit to support the output voltage provided to the load during momentary breaks in the source voltage $V_s$ provided from the source 21. The energy storage device 39 can take the form of a large energy storage capacitor, which can be maintained charged during normal operation and discharged to carry the conversion circuit through short breaks, or a battery which provides longer term DC power to the conversion circuit. In accordance with the present invention, the conversion circuit 24 utilizes only passive components and electronic switches, and does not require transformers either to regulate the power provided to the load or allow adjustment of the level of the voltage provided to the load. A transformer could, however, be used if isolation was desired.

Figure 2:
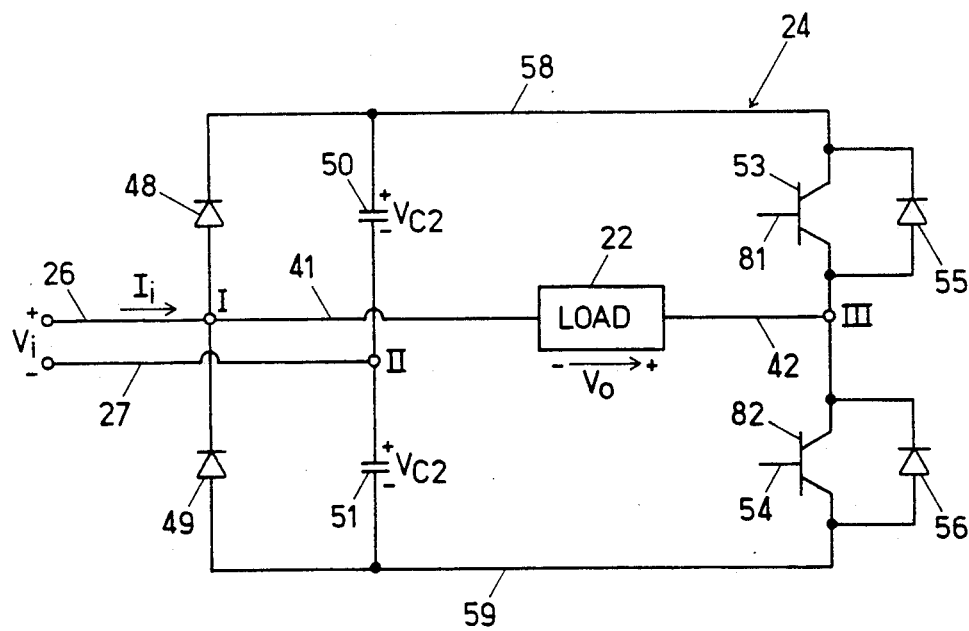
FIG. 2 is a schematic circuit diagram of the conversion apparatus of the present invention connected to a load so as to achieve voltage doubler operation.

An implementation of the power supply apparatus of the present invention having a conversion circuit embodied as a voltage doubler is shown in FIG. 2. For purposes of illustration, the input lines 26 and 27 providing the voltage $V_i$ from the source to the conversion circuit and the output lines 41 and 42 connecting the conversion circuit to the load are given the same reference numerals as in FIG. 1. The neutral input line 26 is connected to the first node, marked as the terminal or node I in FIG. 2, which joins a pair of rectifying devices (e.g., semiconductor diodes) 48 and 49 with the rectifying devices 48 and 49 being connected together to conduct in the same direction, i.e., with the device 48 connected to conduct away from the node and the device 49 connected to conduct toward the node. The other input line 27 is connected to the second node, or terminal II, which joins a pair of capacitors 50 and 51. The third node, or terminal III, joins a pair of switching devices which, in FIG. 2, are shown as bipolar transistors 53 and 54 with parallel connected diodes 55 and 56, respectively, the switching devices being connected to conduct in the same direction. The pairs of rectifying devices, or diodes 48 and 49, the pairs of capacitors 50 and 51, and the pairs of switching devices 53 and 54 are connected together in parallel by DC bus lines 58 and 59. These lines are referred to as DC bus lines because the voltage across them is unipolar, but it is understood that the actual voltage across the lines will be time varying. The load 22 is connected by one of the input lines 42 to the node III and to the common node I by a line 41. The voltage across the load is the voltage across nodes I and III, denoted as $V_o$. The current into the neutral node I from the source is denoted as $I_i$. The voltage across the capacitor 50 is denoted as $V_{c1}$ and the voltage across the capacitor 51 is denoted as $V_{c2}$.

Figure 3:
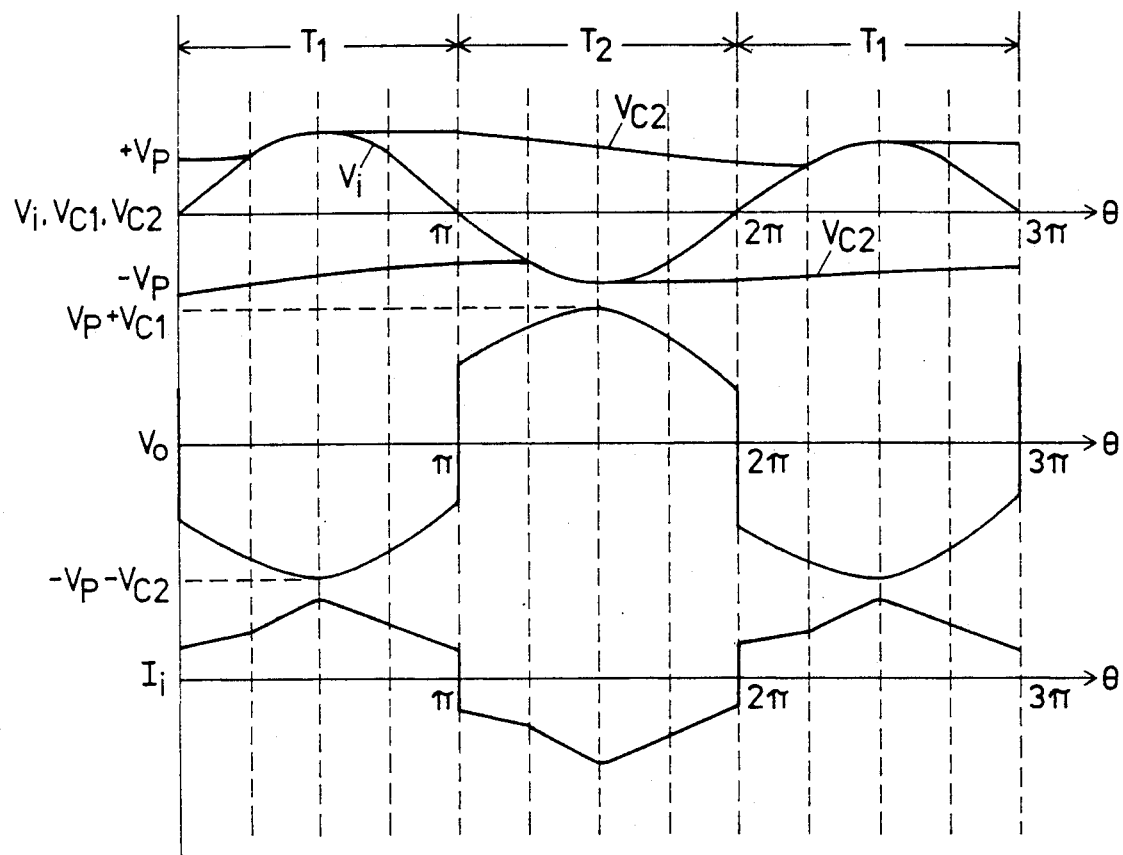
FIG. 3 are exemplary voltage and current waveforms for the circuit of FIG. 2.

The waveforms found in the circuit of FIG. 2 are illustrated in FIG. 3. The circuit works in the following way. When $V_i$ is in the positive half of its waveform, the voltage $V_{c1}$ across the capacitor 50 goes to the peak of the incoming voltage as the capacitor 50 is charged. For example, with an input voltage of 115 volts RMS, the peak charge at voltage $V_{c1}$ on the capacitor 50 is about 162 volts. During the positive going portion of the waveform of the input voltage $V_i$, the switch 54 is gated on, that is, into its conducting state. Consequently, the input voltage (positive going) and the voltage across the capacitor 51, $V_{c2}$ (which is negative at this point), are impressed in series across the load. During this half cycle, depending on the load circuit, the voltage $V_{c2}$ decreases somewhat as the capacitor 51 discharges. While $V_{c2}$ is being discharged into the load 22, the voltage $V_{c1}$ across capacitor 50 is building up as it is being charged from the source voltage. A similar cycle is repeated during the half cycle when the input voltage $V_i$ goes negative, at which time $V_{c1}$ is discharged while it supplies voltage to the load in series with the input voltage, and the voltage $V_{c2}$ increases up to a voltage level of minus $V_P$ (the peak source voltage) as the capacitor 51 charges up. The waveforms for the voltages $V_i$, $V_{c1}$, $V_{c2}$ and $V_0$ and the input current $I_i$ are shown in FIG. 3 for this circuit as a function of input waveform angle $\theta$. The half-wave time span $T_1$ is the time period during which the switch 53 is conducting and the switch 54 is gated off, and the time span $T_2$ is the half-wave time period during which the switch 54 is turned on and the switch 53 is gated off.

The switching devices 53 and 54 may be any gate turn-on and turn-off type device, including bipolar transistors (preferably with parallel diodes as shown in FIG. 2 to protect the transistors) and various types of other gate turn-off devices such as FETs, gate turn-off thyristors and the like.

The present invention uses the input voltage itself to give part of the total voltage needed to obtain voltage doubling capability. The circuit of FIG. 2 may be contrasted with conventional inverter circuits in which the source may be connected between terminals I and II and the load between terminals II and III. Such a connection allows any frequency to be applied to the load. However, output voltage is limited to less than the input voltage.

Figure 4:
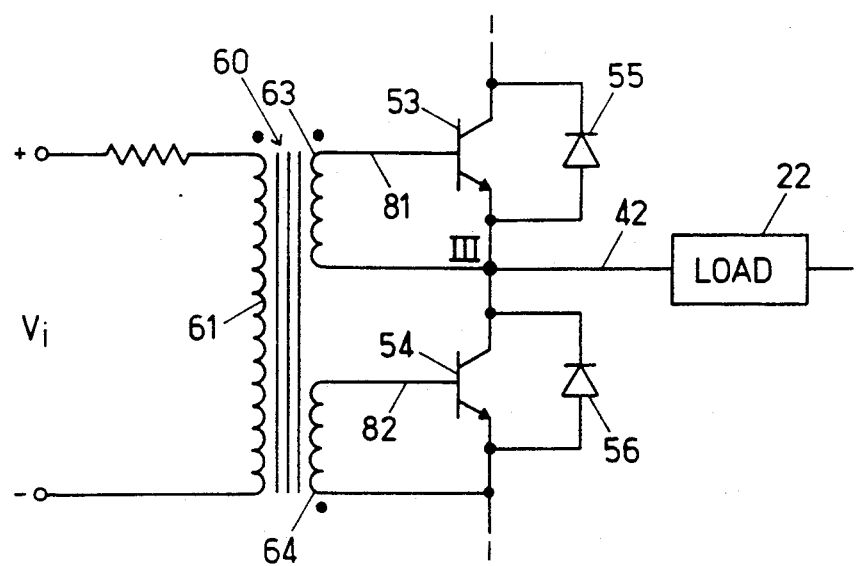
FIG. 4 is an exemplary control circuit for the voltage doubler circuit of FIG. 3.

The control of the circuit of FIG. 2 is readily accomplished. The controller can be implemented to turn on the switch 54 during the half cycle when the voltage $V_i$ is positive, and turn off when $V_i$ is negative, while the switch 53 is gated to turn on during the second half cycle when $V_i$ is negative and turn off when $V_i$ is positive. In this switching arrangement, the switching device 53 or 54 connected by the DC bus lines to the rectifying device 48 or 49 which is conducting is turned off, and the switching device connected to the nonconducting rectifying device is turned on. Some deadtime is preferable between the two conductive periods. A simple approach to control is the use of a small control transformer 60, as shown in FIG. 4, which has the input voltage $V_i$ connected across its primary 61 and with two secondaries 63 and 64 connected, respectively, to the control gates (i.e., the bases) of the switching devices 53 and 54, respectively. The secondaries 63 and 64 are poled to have opposite voltage polarity with respect to one another.

The voltage doubler circuit of FIG. 2 has several desirable features. First, a common neutral is maintained for both the input power source and the load. The peak voltage at the output is no more than (for a 115 V RMS input) 230 $\sqrt{2}$ volts (about 325 volts), a normal voltage range for a 230 volt system. The voltage doubler circuit can thus be used both with electronic loads as well as motors and heaters. It is extremely simple and has a low number of components. As the load current increases, the output voltage droops. This offers some protection against overload. If additional protection is needed, current limiting can be included in the circuit. A simple approach is to turn off both switches 53 and 54 when an over-current is directed.

Figure 5:
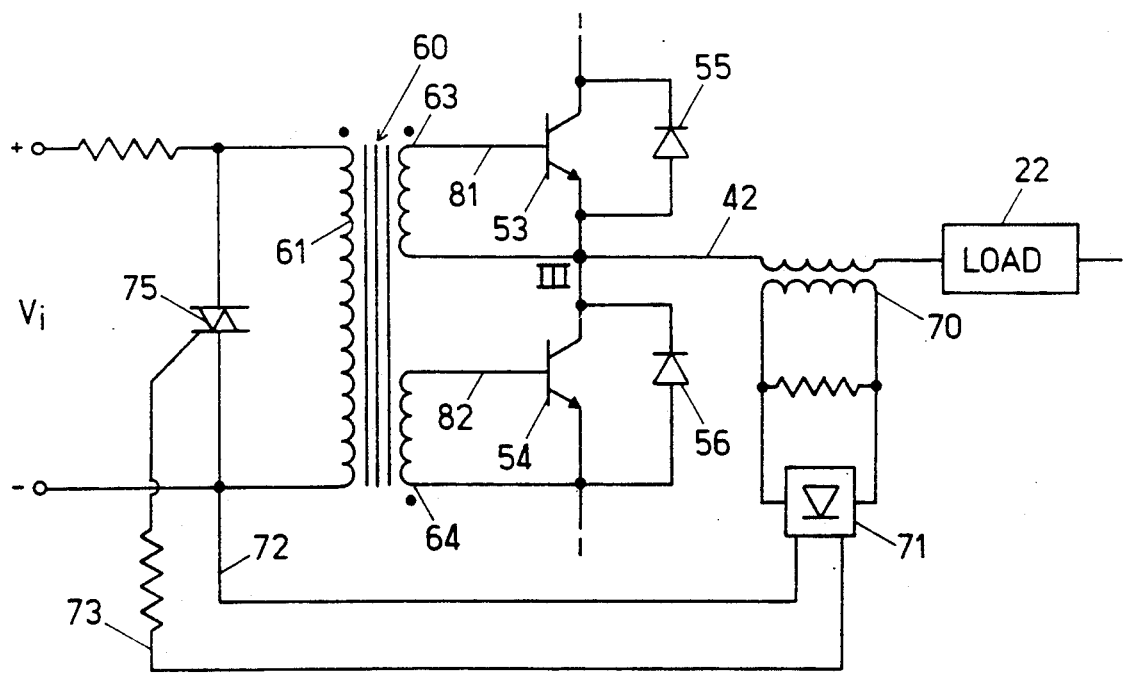
FIG. 5 is a further control circuit for the voltage doubler circuit of FIG. 2.

An overload protection circuit is shown in FIG. 5 which employs a current transformer 70 in the output line 42. The output voltage of the secondary of the transformer 70 is rectified by a rectifying bridge 71 and the rectified output voltage passed on output lines 72 and 73. A triac 75 is connected across the primary 61 of the transformer 60 and has its gate input connected to the input line 73. Whenever overcurrent is detected by the transformer 70, the triac 75 is turned on, which cuts off the current to the bases of both switching devices 53 and 54. The triac turns off at the next zero voltage crossing, and the switches 53 and 54 may then turn on again in the normal manner.

Figure 6:
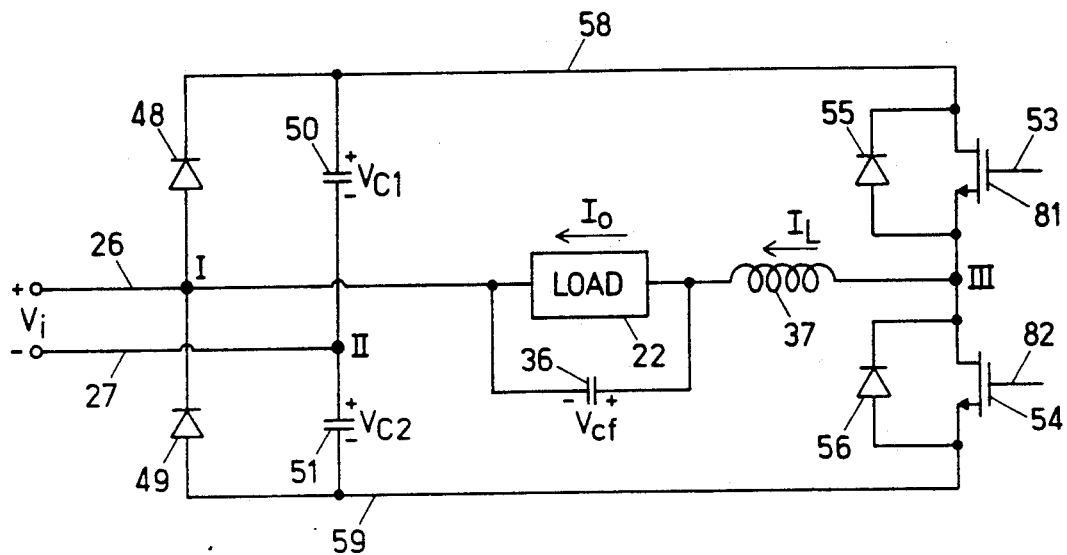
FIG. 6 is a schematic circuit diagram of the conversion apparatus of the invention configured to allow control of the voltage provided across the load.

The power conversion circuit 24 can be operated to provide conditioning of the power provided to the load if the switching devices 53 and 54 are operated under pulse width modulated (PWM) control. Using such control of the switching devices 53 and 54, the circuit can provide output voltages to the load 22 at essentially all voltages between zero and twice the input voltage. The power conversion circuit 24 is shown configured in FIG. 6 to provide such power conditioning capability to the load 22, with the addition of a low pass filter composed of the inductor 37 in series with the load 22 and the capacitor 36 in parallel with the load 22. In FIG. 6, the switching devices 53 and 54 are shown as field effect transistors (FETs) rather than the bipolar transistors as shown for the switching devices in FIGS. 2 and 4–5, but the function of the switching devices is exactly the same. Any suitable controllable turn-on and turn-off switching components (e.g., MOSFETs, IGBTs, BJTs, etc.) may be utilized in the present invention. Such devices may be referred to herein as "gate turn-off" devices or "gate controlled" devices for simplicity of description whether or not such devices are conventionally described as having a gate. The only requirement is that the devices should be controllable to turn on and turn off.

The circuit of FIG. 6 uses its voltage doubling capability to realize the boost characteristics necessary to create a line conditioner. This circuit also maintains a common neutral connection for the load, the line 41 which is connected at the node I to the neutral line 26 leading from the voltage source. The operation of the circuit of FIG. 6 is similar to that of the voltage doubler operation except that it is operated with a pulse width modulation strategy. As the source voltage $V_i$ becomes positive, the switch 54 is turned on to impress the maximum negative voltage $-(V_{c2}+V_{ip})$, where $V_{ip}$ is the peak voltage level of the input voltage $V_i$, across the terminals I and II, which applies this voltage across the combination of the load 22 and the LC filter composed of the inductor 37 and the capacitor 36. When the switch 54 is off and the switch 53 is on, a voltage equal to $V_{c1}+V_{ip}$ is applied across the combination of the load 22 and LC filter comprised of the inductor 37 and capacitor 32. When the diode 48 is conducting, the voltage $V_{c1}$ across the capacitor 50 is equal to $V_i$ and the applied voltage across the terminals I and III when the switch 53 is conducting is zero. Similarly, when the diode 49 is conducting, the voltage $V_{c2}$ across the capacitor 51 is equal to $V_i$ and reaches $V_{ip}$. Thus, by varying the duty cycle or conduction periods of the switches 53 and 54, it is possible to obtain control of the current $I_o$ through the load or the voltage across the load. Pulse width modulation (PWM) techniques are well known in the art. See, for example, D. M. Divan, T. A. Lipo and T. G. Habetler, "PWM Techniques for Voltage Source Inverters," Tutorial Notes, Power Electronics Specialists Conference '90, San Antonio, Tex., June 1990.

A variety of control implementations are possible for the circuit of FIG. 6. A simple implementation is a voltage regulator which generates the desired fundamental voltage component at the inverter pole, the node III. Such regulation can be obtained, for example, using a regularly sampled sigma delta modulator. Another way in which regulation can be achieved is using a deadbeat controller which is based on the voltages $V_{c1}$, $V_{c2}$ and $V_i$.

Figure 7:
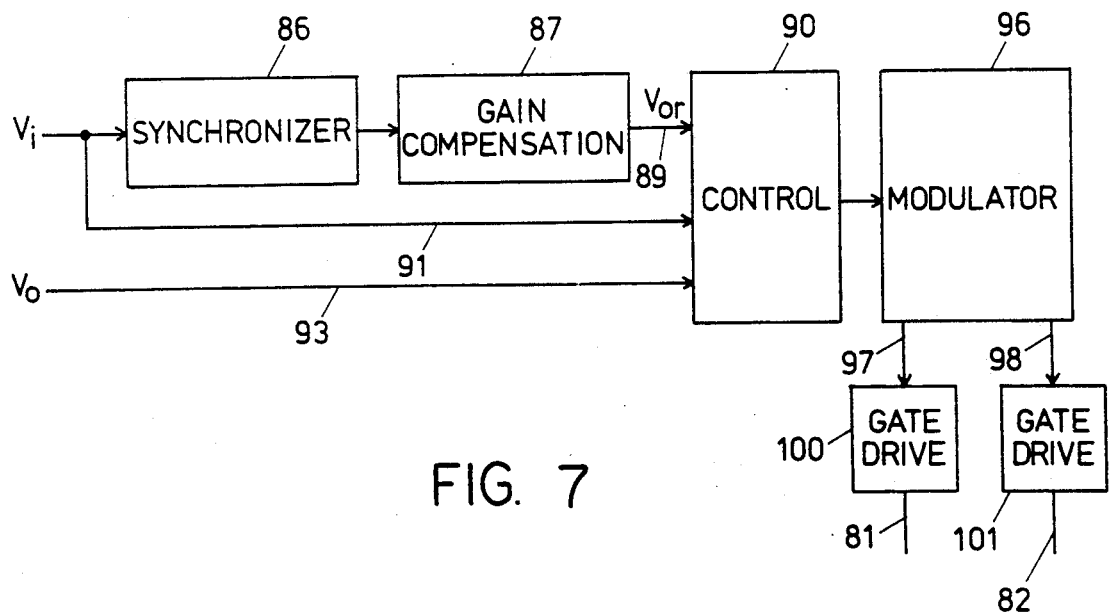
FIG. 7 is a schematic block diagram of a controller for controlling the switching of the switching devices in the circuit of FIG. 6 to provide feedback control of the voltage across the load.

A block diagram of an exemplary voltage regulator for the circuit of FIG. 6 is shown in FIG. 7. This voltage regulator utilizes the input voltage $V_i$ and the inverter output voltage $V_o$, the voltage between the terminals III and I. The input voltage $V_i$ is provided on a line 85 to a reference generator composed of a synchronizer 86 and a gain compensation circuit 87. The synchronizer 86 may be of any conventional design well known in the art, and provides a synchronized output signal, such as by filtering the input signal to isolate the fundamental frequency or by utilizing a phase locked loop. The circuit 87 provides a desired gain compensation to the output signal from the synchronizer 86 to yield the reference output voltage $V_{or}$ on a line 89. The reference voltage signal $V_{or}$ has the correct amplitude, is a relatively pure sinusoidal signal and does not contain spikes or noise impulses which might otherwise be present in $V_i$. The synchronized output voltage $V_{or}$ on the line 89 is provided to a control circuit 90 which also receives, if desired, the raw input signal $V_i$ on a line 91, and also the output voltage $V_o$ on a line 93. The control circuit compares the reference signal $V_{or}$ with the output voltage $V_o$ under normal conditions (or with the input $V_i$ where a reference signal $V_{or}$ cannot be obtained from the input signal) to yield an error output signal on lines 95. These output signals are provided to a pulse width modulator 96 which provides gating output signals on lines 97 and 98 through gate drivers 100 and 101 to the gate lines 81 and 82, respectively, of the switching devices 53 and 54.

An alternative control arrangement may use voltage feedback from the filter output voltage as well as the feedback of inductor current and output current (or capacitor current) to create an error signal to control the modulator. The use of current regulators is especially beneficial in pulse width modulated inverters, particularly where insensitivity to non-linear loads is desirable.

Exemplary circuit component values for the circuit of FIG. 6 include capacitance for capacitors 50 and 51 of 1000µf, capacitance $C_f$ of the filter capacitor 36 of 1000µf, inductance $L_f$ of the inductor 37 of 100µh, a sampling frequency of 100 KHz, and with the capacitors rated for 150 volts peak and the switching devices rated for 325 volts. The low pass LC filter composed of the inductor 37 and capacitor 36 has a cut-off frequency of approximately 500 Hz and can provide protection for spikes and short transients on the line in addition to filtering of harmonic components in the PWM waveform. Such a circuit can maintain an output voltage across the load 22 at a desired level (e.g., 115 volts RMS) even where the input voltage $V_i$ drops substantially below that level (e.g., to 85 volts RMS). Regulation of the output voltage is also obtained where the input voltage goes higher than the desired output voltage.

Additional line inductance in the non-neutral input line 27 can be utilized if desired to reduce the impact of charging of the capacitors 50 and 51. The capacitors 50 and 51 can be made reasonably small, allowing deep discharge during every cycle. Doing so reduces the required size of the capacitors 50 and 51 and minimizes the peak line input current.

Figure 8:
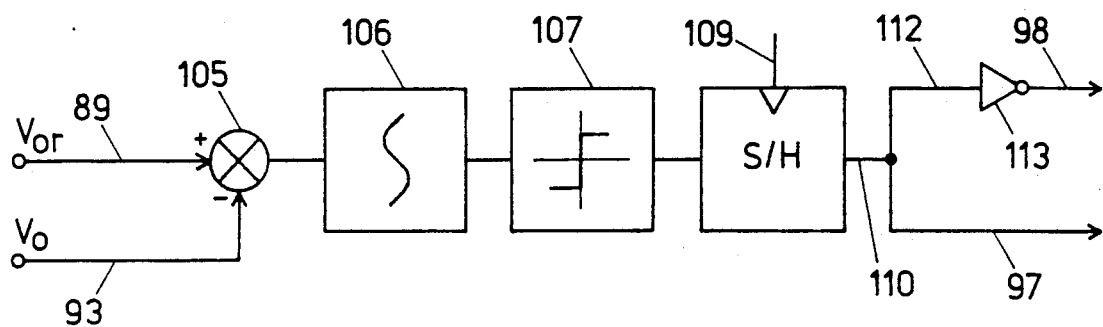
FIG. 8 is a schematic block diagram of a sigma delta modulator which can be utilized in the controller of FIG. 7.

An exemplary sigma delta modulator implementation of the controller 90 and modulator 96 is shown in FIG. 8. The output signal $V_o$ on the line 93 is subtracted at a summing junction 105 from the reference voltage $V_{or}$ on the line 89, and the difference is provided to an integrator 106. The output of the integrator 106 is provided to a bang-bang limiter 107, the output of which is provided to a sample and hold circuit 108. The sample and hold circuit receives a signal at the sampling frequency on a line 109 and provides an output signal on a line 110 between each sampling pulse which is equal to the input to the sample and hold circuit 108 at the time of the sampling pulse on the line 109. This output is held until the next sampling pulse. The output signals on the line 110 are provided on the line 97 leading to the gate drive circuit 100 to drive the gate line 81 of the switching device 53. The signals on the line 110 are also provided on a line 112 to an inverter 113 which provides the inverted output signals to the line 98 leading to the gate drive 101 connected to the gate line 82 of the switching device 54. Thus, the switching devices 53 and 54 are controlled to switch complementary to each other.

Figure 9:
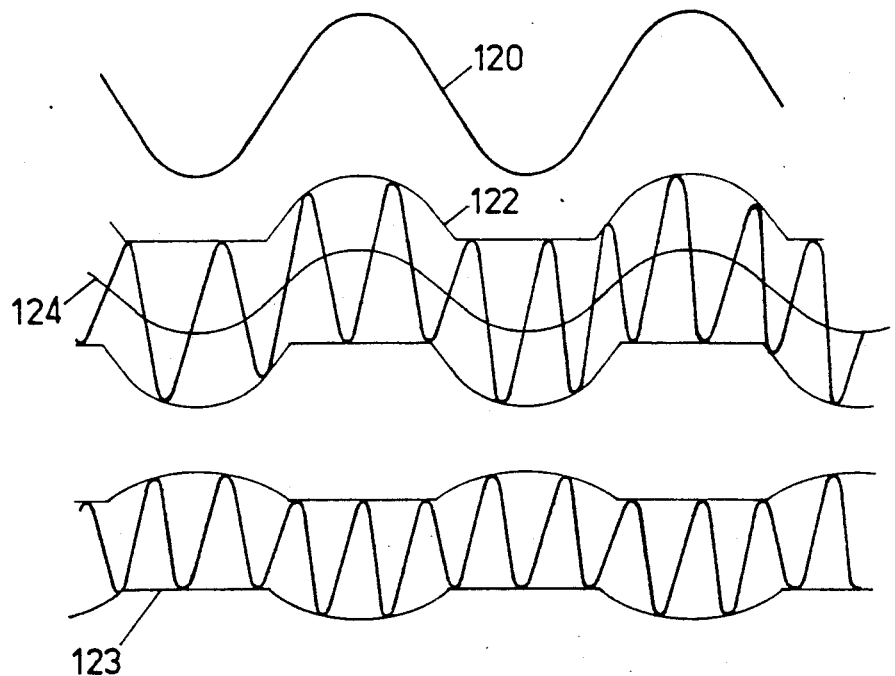
FIG. 9 are graphs of exemplary voltage waveforms for the circuit of FIG. 6.

In an exemplary implementation of the circuit of FIG. 6 utilizing the modulator of FIG. 8, the sampling frequency provided to the sample and hold circuit 108 was 30 KHz. A filter capacitor 36 of value $C_f=75\mu f$ and capacitors 50 and 51 each of 470$\mu f$ were used. This circuit can be operated with both buck and boost operation. For example, the waveforms illustratively shown in FIG. 9 were obtained with boost operation, with the waveform 120 indicating the input voltage $V_i$ with respect to the neutral node I, the waveform 122 showing the pulse width modulated waveform of the output signal $V_o$ with respect to the neutral I, and the waveform 123 showing the difference voltage $V_o$-$V_i$, the pulse width modulated waveform. Within the pulse width modulated envelope of the waveform 122 is the output voltage waveform 124 of the voltage $V_L$ which is applied across the load 22.

The foregoing line conditioning circuits can be extended to provide uninterruptible power to a load, allowing the circuit to be used as an uninterruptible power system (UPS). The power conversion apparatus of the present invention can be configured as an on-line UPS system for both buck and boost operation without requiring a transformer.

Figure 10:
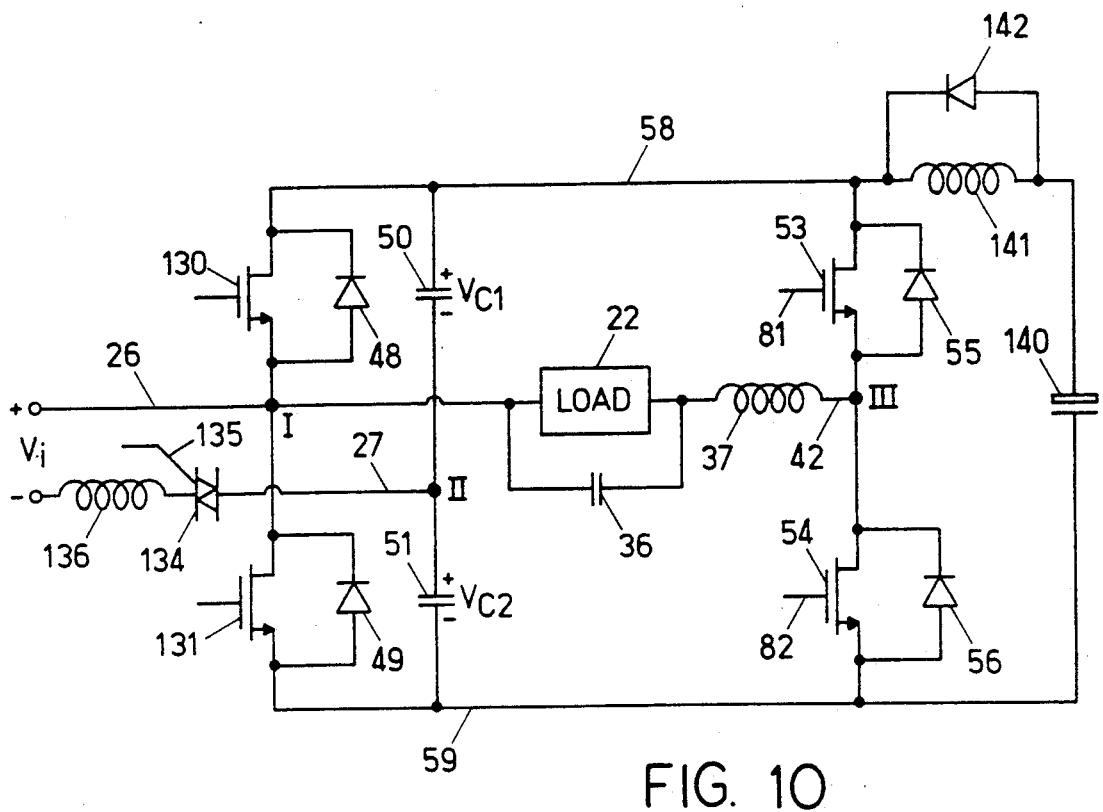
FIG. 10 is a schematic circuit diagram of the conversion apparatus of the invention configured to provide uninterruptible power to the load during momentary input power loss.

Power conversion apparatus of the present invention configured as a UPS circuit having limited ride-through with passive energy storage is shown in FIG. 10. The circuit is basically the same as described above for the power conditioner of FIG. 6 but employs additional gate turn-on and turn-off controlled switching devices 130 and 131 connected around the diodes 48 and 49, respectively. An additional static bypass switch 134 (e.g., a triac) controlled by a gate control line 135, and a small load inductor 136 (to improve the input line current waveform) are connected in the line 27 between the power source and the terminal II. It is noted that a similar small inductor could be connected in the input line 27 in the circuits of FIGS. 2 and 6 for the same purpose. For purposes of description herein, the combination of the switching device 130 and the diodes 48 and the combination of the switching device 131 and the diode 49 are considered rectifying devices. If these rectifying devices function only as diodes, then because the switches 53 and 54 form a half bridge, only voltages less than half the total supply voltage can be obtained. However, by using the additional switches 130 and 131, a full bridge circuit is obtained. Thus, for a 115 volt RMS input voltage $V_i$, the DC bus voltage, the voltage across the DC bus lines connecting lines 58 and 59, can be charged up to about 350 volts DC. To provide a 110 volt output with a full bridge, the DC bus only needs to be greater than 165 volts. Consequently, output voltage regulation can be maintained from a bus voltage of about 350 volts DC down to 165 volts DC.

If the capacitors 50 and 51 are sufficiently large, enough energy may be stored in these capacitors to provide a short-term ride-through capability. In a preferred alternative, a large capacitor 140, which may be an electrolytic capacitor since only a DC voltage is maintained across it, is connected across the DC bus lines 58 and 59 in parallel with the switching devices 53 and 54. To control the rate of charge of the capacitor 140 while allowing free discharge of the capacitor when necessary, a parallel connected inductor 141 (or alternatively, a small resistor) and diode 142 are connected in series with the capacitor 140 across the DC bus lines 58 and 59. Charging current from the lines 58 and 59 flows through the capacitor 140 at a low, limited rate. However, when the power supply voltage $V_i$ fails, the static bypass switch 134 is turned off to isolate the power conversion circuit from the source, and power is supplied from the capacitor 140 until it discharges. For relative comparison purposes, if the capacitor 140 has capacitance equal to 1000$\mu f$, a 1 kilowatt (kw) discharge rate yields a 90 millisecond (msec) ride-through capability. By increasing the capacitance of the capacitor 140 to 10,000$\mu f$ now provides almost one second of ride-through, which is sufficient for many applications where momentary power line glitches must be handled. The circuit of FIG. 10 can provide ride-through capability without the elements 140, 141 and 142. However, to do so, the capacitors 50 and 51 would have to be relatively large.

Figure 11:
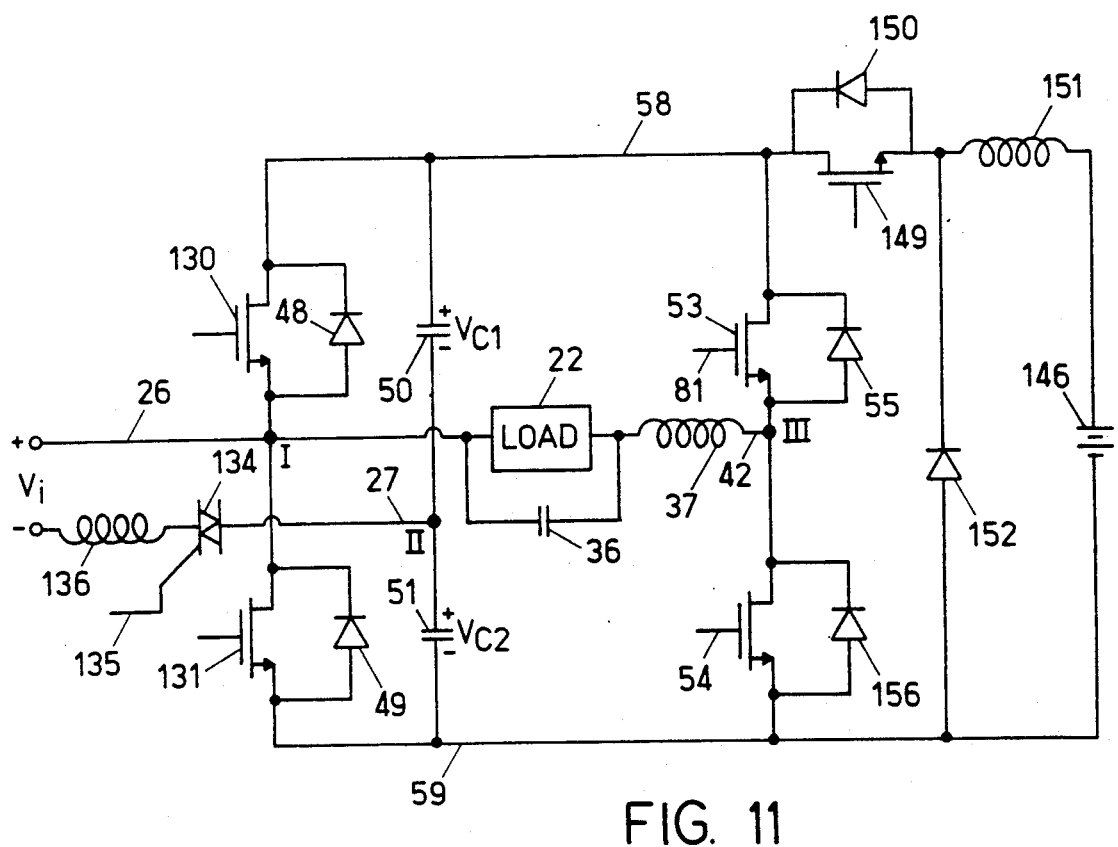
FIG. 11 is a schematic circuit diagram of the conversion apparatus of the invention configured to provide uninterruptible power to the load during longterm input power outages.

Because four active switches are provided in the circuit of FIG. 10, enhanced control of this circuit can be obtained. The switching of the switching devices 53, 54, 130, and 131 can be used to control both the input current and the load current. Such control also, indirectly, provides control of the DC bus voltage. Consequently, the circuit is capable of full control of the output current and voltage, the input current, and the DC bus voltage, as well as yielding automatic ride-through capability as a result of the wide operating range of the DC bus voltage. The circuit of FIG. 11 can function as a true UPS by substituting a battery for the capacitor 140, inasmuch as both function as energy storage devices. In the circuit of FIG. 11, the battery voltage must be as great as the peak-to-peak voltage on the DC bus lines, e.g., 350 volts.

The power conversion apparatus of the invention especially configured for UPS operation is shown in FIG. 11. The circuit of FIG. 11 is similar to that of FIG. 10 with the major difference that the capacitor 140 is replaced with a battery 146 which is connected across the DC bus lines 58 and 59. To control the power supplied to and provided from the battery 146, a gate controlled switching device 149 and parallel connected diode 150 are connected in series with the battery along with a small inductor 151. A diode 152 is connected across the battery 146 and inductor 151 to prevent reverse flow of current through the battery. The circuit of FIG. 11 can achieve boost operation as well as buck operation, that is, output voltages higher than the input voltage can be obtained as well as voltages lower than the input voltage. The circuit of FIG. 11 can be used in UPS applications without a low frequency transformer, minimizing the cost of the UPS system. Continued operation over a DC supply voltage of 350 to 165 volts DC and 115 volt RMS AC applications is now possible, making available a passive ride-through option.

Figure 12:
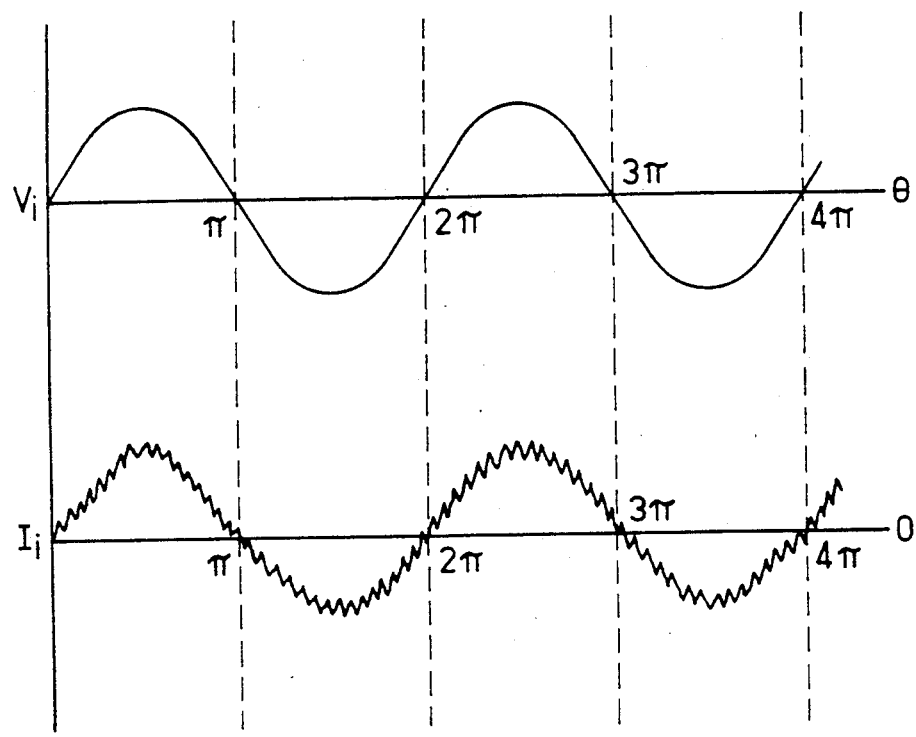
FIG. 12 are graphs of exemplary supply voltage and line current waveforms for the circuits of FIGS. 10 and 11.

The active devices in the circuits of FIGS. 10 and 11 are required to handle twice the peak voltage of the input voltage, and the capacitors 50 and 51 must have a relatively high current rating. However, the capacitors 50 and 51 can be made fairly small, and can thus be almost completely discharged over a half cycle. These circuits further have the advantages of excellent output regulation capability, control of input currents, and the provision of a common neutral connection. Exemplary supply voltage $V_i$ and line current $I_i$ waveforms for the circuits of FIGS. 10 and 11 are shown in FIG. 12. The circuits allow fully controlled input currents, thus allowing sinusoidal input currents at unity power factor.

The circuit configuration of FIG. 11 allows a relatively low voltage battery to be used and enables deep DC bus discharge capability. The switch 149, the inductor 151 and the diode 152 form a buck chopper which can be used to charge the battery 146, which may now be maintained at half the normal DC bus value (e.g., 165 volts). Upon power line failure where the source voltage $V_i$ is lost, as the DC bus voltage across the lines 58 and 59 discharges, the diode 146 becomes forward biased and the battery 146 supplies the power to the load. All other control functions remain similar to that of the circuit of FIG. 11 with the capacitor 140 replaced by a battery. The circuit of FIG. 11 allows the use of a smaller battery, reduces the amount of battery cycling, and gives optimal battery charging performance.

It is understood that the invention is not confined to the particular embodiments set forth herein as illustrative, but embraces such modified forms thereof as come within the scope of the following claims.

What is claimed is:

1. Single phase AC power conversion apparatus for converting power from an AC power source at one frequency and voltage level to supply power to a load comprising:
   (a) a pair of rectifying devices connected together at a first node, one rectifying device connected to conduct into the node and the other rectifying device connected to conduct away from the node;
   (b) a pair of capacitors connected together at a second node;
   (c) a pair of controllable turn-off and turn-on switching devices connected together at a third node;
   (d) a pair of DC bus lines connecting the pairs of rectifying devices, capacitors and switching devices in parallel; and
   (e) control means for controlling the switching of the switching devices when the AC power source is connected to supply AC voltage between the first node and the second node such that the voltage between the third node and the first node, which is the output voltage provided to the load, differs from the voltage provided by the AC power source and is at the same frequency as the AC power source voltage.

2. The apparatus of claim 1 wherein the means for controlling the switching devices turns on a first of the switching devices which is connected to the rectifying device that is not conducting during a first half of the voltage waveform from the AC power and switches off the second of the switching devices during the first half of the voltage waveform from the AC power source, and then turns off the first switching device and turns on the second switching device during the second half of the voltage waveform from the AC power source, such that the peak to peak voltage applied across the load is substantially doubled from the peak to peak voltage from the AC power source.

3. The apparatus of claim 2 wherein the means for controlling includes a transformer connected to receive at its primary the voltage from the AC power source and having two oppositely poled secondaries, each secondary connected to supply its output to control one of the switching devices so that one of the switching devices is turned on and the other turned off during each half cycle of the voltage waveform from the AC power source.

4. The apparatus of claim 3 including overcurrent protection means for sensing the current provided to the load and ceasing the switching of the switching devices to cut off power to the load when the current supplied to the load exceeds a selected value.

5. The apparatus of claim 4 wherein the over current protection means includes a gate controlled static switch connected across the primary of the transformer and a current transformer and rectifier connected to sense the current in an output line leading to the load and to provide a turn-on signal to the gate of the static switch when the current level in the transformer exceeds a selected maximum current.

6. The apparatus of claim 1 wherein the switching devices are bipolar transistors which are controlled by control signals provided to their bases.

7. The apparatus of claim 1 wherein the switching devices are field-effect transistors which are controlled by control signals applied to their gates.

8. Single phase AC power conversion apparatus for converting power from an AC power source at one frequency and voltage level to supply power to a load at the same frequency and at a controllable voltage level, comprising:
   (a) a pair of rectifying devices connected together at a first node, one rectifying device connected to conduct into the node and the other rectifying device connected to conduct away from the node;
   (b) a pair of capacitors connected together at a second node;
   (c) a pair of controllable turn-off and turn-on switching devices connected together at a third node;
   (d) a pair of DC bu lines connecting the paris of rectifying devices, capacitors and switching devices in parallel, voltage from the AC power source being provided between the first and second nodes and output voltage being provided between the first and third nodes;
   (e) a filter connected between the first and third nodes to low pass filter the output voltage; and
   (f) control means for controlling the switching of the switching devices when the AC power source is connected to supply AC voltage between the first node and the second node such that the filtered output voltage provided between the third node and the first node to the load is controlled to a level between substantially zero and substantially twice the peak-to-peak voltage provided form the AC power source and at the same frequency as the AC power source voltage.

9. The apparatus of claim 8 including overcurrent protection means for sensing the current provided to the load and ceasing the switching of the switching devices to cut off power to the load when the current supplied to the load exceeds a selected value.

10. The apparatus of claim 8 wherein the switching devices are bipolar transistors which are controlled by control signals provided to their bases.

11. The apparatus of claim 8 wherein the switching devices are field-effect transistors which are controlled by control signals applied to their gates.

12. The apparatus of claim 8 wherein the filter is composed of a capacitor in parallel with the load and an inductor in series with the load to provide a low pass filter.

13. The apparatus of claim 8 wherein the control means turns the switching devices on and off in a pulse width modulated manner to control the voltage level provided to the load.

14. The apparatus of claim 13 wherein the control means includes means for comparing the output voltage provided to the load to a reference voltage and controls the switching of the switching devices in a pulse width modulated manner to regulate the output voltage to the reference voltage.

15. The apparatus of claim 14 wherein the control means includes a sigma delta modulator which provides the pulse width modulation by which the switching devices are controlled.

16. Single phase uninterruptible AC power conversion apparatus for converting power from an AC power source at one frequency and voltage level and supplying power to a load, comprising:
 (a) a pair of rectifying devices connected together at a first node, one rectifying device connected to conduct into the node and the other rectifying device connected to conduct away from the node;
 (b) a pair of capacitors connected together at a second node;
 (c) a pair of controllable turn-off and turn-on switching devices connected together at a third node;
 (d) a pair of DC bus lines connecting the pairs of rectifying devices, capacitors and switching devices in parallel, the voltage from the AC power source provided between the first and second nodes and the output voltage provided between the first and third nodes;
 (e) a filter connected to low pass filter the output voltage provided between the first and third nodes to the load;
 (f) a DC energy storage device connected across the DC bus lines; and
 (g) means for controlling the switching of the switching devices when the AC power source is connected to and is supplying AC voltage at a desired voltage level between the first node and the second node such that the output voltage between the third node and the first node is at a desired level between substantially zero and substantially twice the peak-to-peak voltage from the AC power source and at the same frequency as the AC power source voltage, and for inverting the DC voltage provided from the energy storage device to provide an AC voltage to the load when AC power from the AC power source fails.

17. The apparatus of claim 16 including overcurrent protection means for sensing the current provided to the load and ceasing the switching of the switching devices to cut off power to the load when the current supplied to the load exceeds a selected value.

18. The apparatus of claim 16 wherein the switching devices are bipolar transistors which are controlled by control signals provided to their bases.

19. The apparatus of claim 16 wherein the switching devices are field-effect transistors which are controlled by control signals applied to their gates.

20. The apparatus of claim 16 wherein the filter is composed of a capacitor in parallel with the load and an inductor in series with the load to provide a low pass filter.

21. The apparatus of claim 16 wherein the control means turns the switching devices on and off in a pulse width modulated manner to control the voltage level provided to the load.

22. The apparatus of claim 21 wherein the control means includes means for comparing the output voltage provided to the load to a reference voltage and controls the switching of the switching devices in a pulse width modulated manner to regulate the output voltage to the reference voltage.

23. The apparatus of claim 22 wherein the control means includes a sigma delta modulator which provides the pulse width modulation by which the switching devices are controlled.

24. The apparatus of claim 16 wherein the energy storage device is a capacitor.

25. The apparatus of claim 16 including a gate turn-off and turn-on switching device in parallel with each of the rectifying devices which can be controlled to turn on to charge up the energy storage capacitor.

26. The apparatus of claim 16 wherein the energy storage device is a battery.

27. The apparatus of claim 26 including means for charging the battery from the power provided from the AC power source.

28. The apparatus of claim 27 wherein the means for charging includes a controllable turn-on and turn-off switching device in parallel with each of the rectifying devices which can be controlled to provide charging of the battery from power supplied form the AC power source during normal operation of the AC power source, and full bridge inverted power to the load from the battery when power from the AC power source fails.

29. The apparatus of claim 28 including a gate controlled static bypass switch connected in a line between the AC power source and one of the nodes to which the AC power source is connected which can be turned off to disconnect the AC power source from the node when the AC power source fails.

30. The apparatus of claim 29 including a static switch and a diode connected in parallel therewith connected between the battery and one of the DC bus lines to allow control of the power supplied to the battery during charging.

* * * * *

UNITED STATES PATENT AND TRADEMARK OFFICE
CERTIFICATE OF CORRECTION

PATENT NO. : 5,099,410

DATED : March 24, 1992

INVENTOR(S) : Deepakraj M. Divan

It is certified that error appears in the above-identified patent and that said Letters Patent is hereby corrected as shown below:

Column 11, line 55, add --source-- after "power".

Column 12, line 53, "form" should be --from--.

Signed and Sealed this

Twenty-ninth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,099,410

DATED : March 24, 1992

INVENTOR(S) : Deepakraj M. Divan

It is certified that error appears in the above-identified patent and that said Letters Patent is hereby corrected as shown below:

Column 12, line 38, "bu" should be --bus--.

Column 12, line 38, "paris" should be --pairs--.

Column 14, line 42, "form" should be --from--.

Signed and Sealed this

Twenty-eighth Day of December, 1993

*Attest:*

BRUCE LEHMAN

*Attesting Officer*     *Commissioner of Patents and Trademarks*